United States Patent Office 3,181,654
Patented May 4, 1965

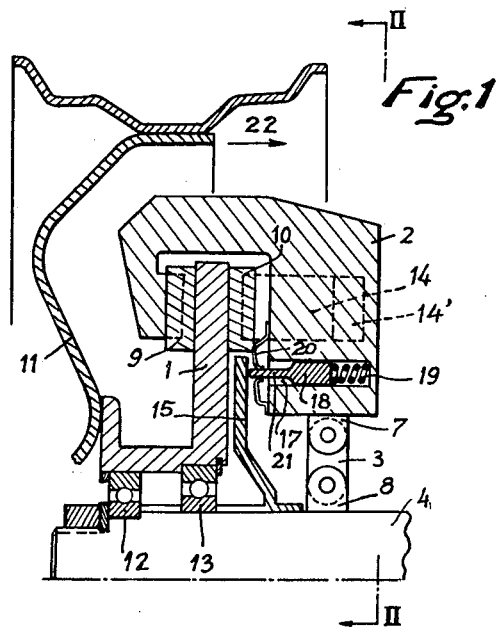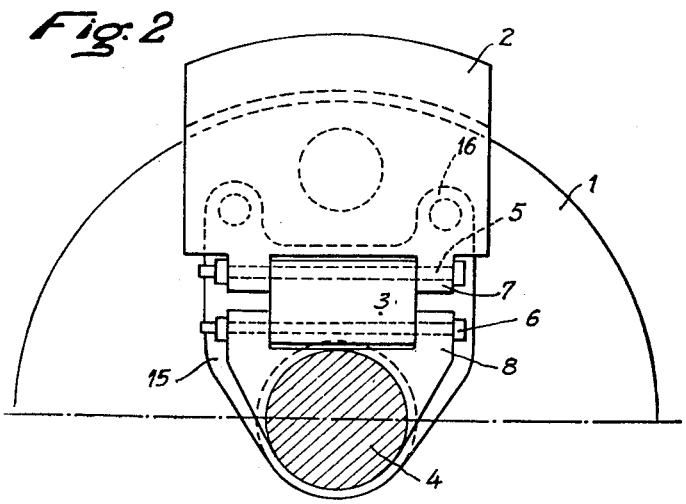

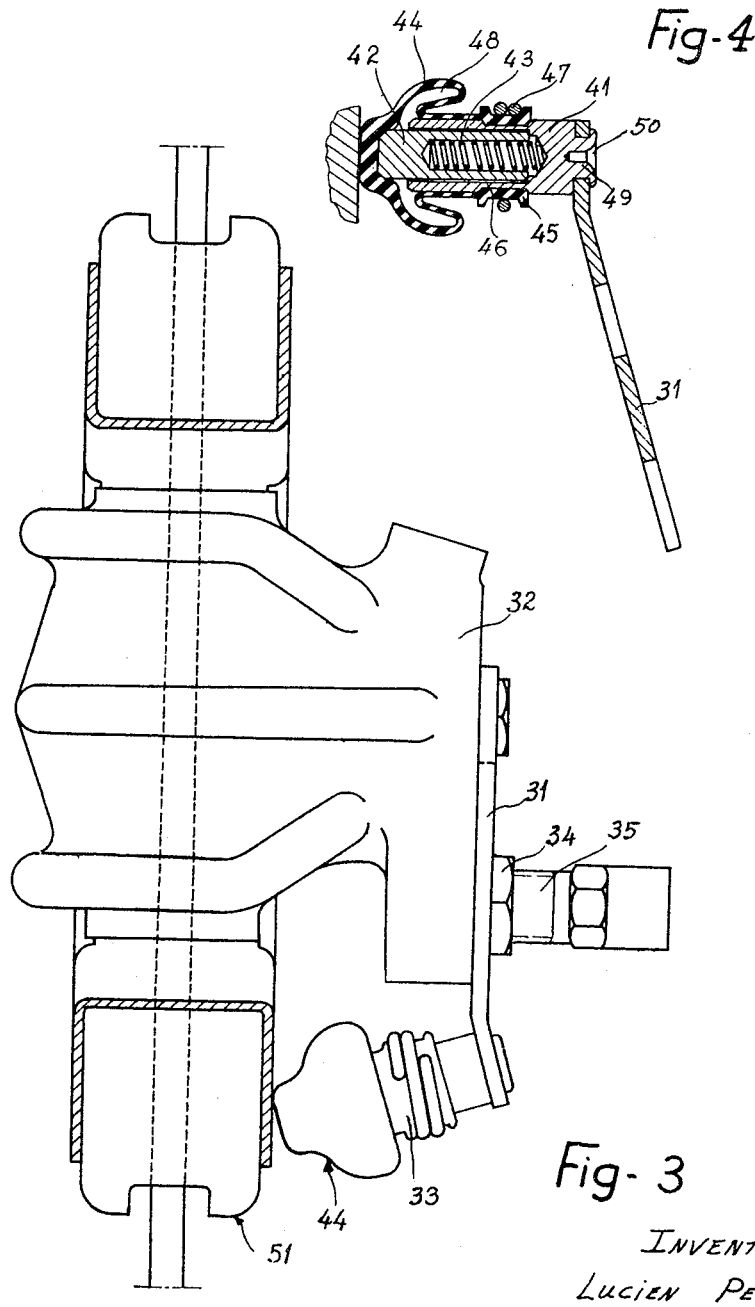

3,181,654
DISC BRAKES
Lucien Péras, Billancourt, France, assignor to Regie Nationale des Usines Renault, Billancourt, Seine, France, a French works
Filed Sept. 17, 1963, Ser. No. 309,485
Claims priority, application France, Sept. 22, 1962, 910,205, Patent 1,344,975; June 26, 1963, 939,462, Patent 83,891
6 Claims. (Cl. 188—73)

This invention relates to disc brakes, notably for automobile vehicles, of the type wherein a block or casing carrying the hydraulic piston or pistons on one side only of the brake disc is adapted to clamp the linings on either side of the disc, whereby said block must compulsorily be movable transversely to the disc.

However, this arrangement is attended by the inconvenience that the block or brake-cylinder casing is constantly subjected to vibration and that it is therefore necessary to provide some means for preventing the control piston which is rigid with one of the linings from receding if, as in most instances, the brake is operated hydraulically by delivering fluid under pressure into a cylinder carried by the block and having slidably mounted therein a clamping piston receiving directly one of the linings, the other lining being supported by the block on the other face of the disc.

To avoid this inconvenience, the present invention provides, in conjunction with the block or casing, a dash-pot or like damping device acting between the block and the wheel stub axle or any other non-rotary member, this device moving bodily with the wheel during the suspension beats or like movements. This damping action is produced preferably by means of high-viscosity fluid, that is, such that no effort develops until a control movement takes place.

According to a specific form of embodiment, this invention contemplates the combination, with a floating-block disc brake, of a dash-pot or like damping device which is particularly advantageous due to its extreme simplicity and therefore to its low cost, which makes it particularly suitable for mass-production.

Typical forms of embodiment of the disc brake construction according to this invention will be described hereinafter with reference to the accompanying drawings, in which:

FIGURE 1 is a cross-sectional view showing a first form of embodiment of the brake of this invention;

FIGURE 2 is a rear view of the brake as seen in the direction of the arrows II—II;

FIGURE 3 is a side elevational view of the floating-block disc brake of this invention equipped with an external damper, and FIGURE 4 is a longitudinal section of the damper shown in FIG. 3.

Referring first to FIGS. 1 and 2 of the drawings, the invention is illustrated therein as applied to a floating-block or floating-casing disc brake wherein the block or casing is pivoted on a shackle and carries the brake linings, but it would not constitute a departure from the basic principle of this invention to apply the same invention to any other type of floating blocks or casings, notably to those wherein the linings are carried by a member permitting their sliding movements in a direction at right angles to the disc faces in order to absorb the tangential braking effort.

In the drawing, the brake disc illustrated in FIGS. 1 and 2 comprises a block, casing or strap 2 straddling the brake disc proper 1 and pivotally mounted by means of a shackle 3 on the stub axle 4 by means of pins 5, 6 extending through lugs 7, 8, respectively which are rigid with the block and the stub axle, respectively. The block 2 carries two linings 9, 10 adapted to clamp the disc 1 supporting the wheel 11 and mounted on the stub axle by means of a pair of rolling-contact bearings 12, 13.

The left-hand lining 9 in FIG. 1 is rigid with the block 2 and the opposite lining 10 is carried by a piston 14 slidably mounted in turn in a cylinder 14' to which hydraulic braking pressure is applied through known means (not shown).

To damp out the transverse movements to which the block 2 is subjected when the brake is not operated, there is provided according to the essential feature of this invention an abutment member 15 rigid with the stub axle 4 and formed with a pair of symmetric lugs 16; registering with these lugs 16 are a pair of blind holes 17 formed in the block 2 and having each slidably mounted therein a plunger or piston 18 constantly urged outwards by a compression coil spring 19. A cap 20 permits the sliding movements of the piston while sealing the assembly. The chambers thus formed on either side of the main portion of piston 18 are filled with a high-viscosity fluid. The piston shank or extension 21 extends in fluid-tight relationship through the cap 20 to engage the member 15.

This assembly operates as follows:

The springs 19 as already explained urge the pistons 18 outwards and these pistons engage with their shanks the lugs 16 of member 15. Then the springs 19 tend to move the block 2 in the direction of the arrow 22, as shown on top of FIG. 1. The lining 9 constantly grazes without play the disc 1. The block or casing 2 is prevented from moving abruptly in the direction opposite to the arrow 22 because this movement would make it necessary for the piston 18 to force the high-viscosity fluid through the clearance left between this piston and the blind bore 17 surrounding same, which is a gauged clearance. Under these conditions, no action is exerted on the lining 10 in the direction which would depress its brake-cylinder piston. Thus the device according to this invention, while enabling the linings 9, 10 to remain in contact with the disc 1, affords a high degree of hydraulic gearing-down in the braking system. Any type of floating block or brake-cylinder casing may be used for carrying out the present invention. The damping device may be of any other suitable type; thus, notably, it may consist of members displaceable in relation to each other and having a reduced gap therebetween, this gap being filled with a high-viscosity silicone-containing fluid or the like.

The position of the damping device is immaterial, provided that they efficiently prevent the block or casing 2 from beating freely in relation to the stub axle or to a non-rotary member or part connected geometrically to the brake disc.

In FIGURES 3 and 4 of the drawings there is shown another typical form of embodiment of the present invention, wherein the disc brake assembly comprises a damper mounted externally of the block 32 and carried thereby.

Referring to FIG. 3, it will be seen that on the block 32 there is mounted by means of a sheet-metal arm or bracket 31 secured by the lock-nut 34 of bolt 35 a damper or dash-pot 33; in this example the bolt 35 is the hand-brake adjustment screw.

According to a preferred form of embodiment, the damper 33 illustrated in longitudinal axial section in FIG. 4 consists of a cylinder 41 in which a piston 42 is slidably mounted with a slight clearance (of the order of 0.004"), a compression coil spring 43 housed in a central cavity of piston 42 constantly urging the latter outwards and reacting against the bottom of cylinder 41.

Fitting on the outer end of piston 42 is a flexible bellows 44 having an in-turned portion and an end flange or shoulder 45 engaging a groove 46 formed in the external surface of cylinder 41 and kept in position in this groove by a collar 47 consisting for example of a spring having two or three turns or convolutions.

The inner chamber 48 of the bellows, the bottom of cylinder 41 and the gap formed between the piston 42 and cylinder 41 constitute a sealed chamber which is filled completely with high-viscosity fluid, such as oil, care being taken not to leave any air bubble in this space.

On the end opposite to its opening this cylinder 41 is formed with a cylindrical portion 49 of reduced diameter in which a countersunk blind hole 50 is formed. With this arrangement the damper or dash-pot can be secured by riveting or crimping on a sheet-metal bracket 31 of a shape permitting its convenient fastening on the block.

The dash-pot piston and capped by the bellows 44 bears on a non-rotating part of the wheel mounting which may be for instance the forked arm 51 on which the block is mounted.

Of course, any other method of fastening the dash-pot or damper by means of screws, collars, etc., may be resorted to without departing from the spirit and scope of the invention.

The damper or dash-pot illustrated in FIGS. 3 and 4 of the drawings operates as follows:

The elastic pressure exerted by the spring 43 causes the outer end of piston 42 to bear against the arm 51 and therefore the device to exert a light stress on the block 32. This spring 43 is so calculated that the stress applied to the block 32 balances substantially its weight and keeps this block in such a position that the linings remain adequately parallel to the brake disc. Under these conditions, any vibration of block 32 in relation to arm 51 is efficiently prevented for any abrupt movement of these two parts toward each other is retarded by the flow of oil from the bottom of cylinder 41 to chamber 48, this oil being obviously allowed to flow but at a very low rate through the clearance available between piston 42 and cylinder 41.

In the opposite direction, the spring 43 keeps the piston head 42 constantly in contact with the arm 51.

I claim:

1. A disc-type brake structure used to brake rotary wheels and wherein a brake block straddles a disc which is integrally connected to a rotary wheel, said wheel being suitably supported by a wheel-supporting structure, said block comprising brake linings respectively adapted to press against opposite sides of said disc, said block being mounted for movement transversely of the plane in which said disc lies between braking and non-braking positions, the improvement comprising a damping means adapted to prevent said block from undergoing any said movement during periods when no braking action is desired, said damping means being associated with said block in such a manner as to continuously exert a force against said block tending to keep said block in its non-braking position, and wherein said damping means comprises a piston slidably mounted in a blind bore formed in said block and closed by a sealing cap, said piston having an extension bearing against a stationary member which is carried by the wheel supporting structure, said bore enclosing a coil compression spring urging said piston against said member and a high-viscosity fluid adapted to flow from one to the other side of the damping piston through a gauged clearance.

2. A disc-type brake structure used to brake rotary wheels and wherein a brake block straddles a disc which is integrally connected to a rotary wheel, said wheel being suitably supported by a wheel-supporting structure, said block comprising brake linings respectively adapted to press against opposite sides of said disc, said block being mounted for movement transversely of the plane in which said disc lies between braking and non-braking positions, the improvement comprising a damping means adapted to prevent said block from undergoing any said movement during periods when no braking action is desired, said damping means being associated with said block in such a manner as to continuously exert a force against said block tending to keep said block in its non-braking position, wherein said damping means comprises a stationary abutment member and a yieldable member, said yieldable member abutting said abutment member and also continuously exerting said force against said block, said yieldable member acting along an axis transverse to the plane in which said disc lies, and wherein said damping means comprises a dash-pot means which comprises said yieldable member, said yieldable member comprising a plunger continuously biased against said stationary abutment member.

3. A disc-type brake structure used to brake rotary wheels and wherein a brake block straddles a disc which is integrally connected to a rotary wheel, said wheel being suitably supported by a wheel-supporting structure, said block comprising brake linings respectively adapted to press against opposite sides of said disc, said block being mounted for movement transversely of the plane in which said disc lies between braking and non-braking positions, the improvement comprising a damping means adapted to prevent said block from undergoing any said movement during periods when no braking action is desired, said damping means being associated with said block in such a manner as to continuously exert a force against said block tending to keep said block in its non-braking position, and wherein said damping means comprises a stationary abutment member and a dash-pot means, and wherein said dash-pot means comprises a bore in said block, a plunger slidably fitted for axial movement within said bore, a portion of said plunger extending outwardly of one end of said bore and abutting said abutment member, said bore being sealed at opposite ends thereof and a viscous fluid filling the spaces between opposite ends of said bore and respective opposite end portions of said plunger, said plunger being fitted within said bore with a radial clearance therebetween adapted to permit restricted flow of said viscous fluid between said spaces.

4. The brake structure of claim 3, wherein said continuous force is exerted by a resilient means constantly urging said plunger in one axial direction relative to said bore.

5. The brake structure of claim 4, wherein said resilient means is a compression spring.

6. A disc-type brake structure used to brake rotary wheels and wherein a brake block straddles a disc which is integrally connected to a rotary wheel, said wheel being suitably supported by a wheel-supporting structure, said block comprising brake linings respectively adapted to press against opposite sides of said disc, said block being mounted for movement transversely of the plane in which said disc lies between braking and non-braking positions, the improvement comprising a damping means adapted to prevent said block from undergoing any said movement during periods when no braking action is desired, said damping means being associated with said block in such a manner as to continuously exert a force against said block tending to keep said block in its non-braking position, said damping means being disposed externally of said block and being mounted on a bracket secured on said block, said damping device comprising a piston slidably fitted in a cylinder with a gauged clearance existing between said piston and the wall of said cylinder, said piston being urged by a coil compression spring against a stationary member and being capped by a bellows-like member fitting in fluid-tight manner on said cylinder, said bellows-type member and the space available between said cylinder and the inner end of said piston being filled with oil, said oil being allowed to flow from one to the other side of said piston only through said gauged clearance.

References Cited by the Examiner
UNITED STATES PATENTS
2,533,186   12/50   Bricker et al. _____ 188—73

ARTHUR L. LA POINT, *Primary Examiner.*
EUGENE G. BOTZ, *Examiner.*